(12) United States Patent
Currenti et al.

(10) Patent No.: US 11,080,462 B2
(45) Date of Patent: Aug. 3, 2021

(54) METHOD OF COMPARING TWO DATA TABLES AND DISPLAYING THE RESULTS WITHOUT SOURCE FORMATTING

(71) Applicant: Workshare Ltd., London (GB)

(72) Inventors: Anthony Currenti, London (GB); Robin Glover, London (GB)

(*) Notice: Subject to any disclaimer, the term of this patent is extended or adjusted under 35 U.S.C. 154(b) by 0 days.

(21) Appl. No.: 16/189,828

(22) Filed: Nov. 13, 2018

(65) Prior Publication Data

US 2019/0147016 A1 May 16, 2019

Related U.S. Application Data

(60) Provisional application No. 62/591,877, filed on Nov. 29, 2017, provisional application No. 62/587,968, filed on Nov. 17, 2017, provisional application No. 62/585,212, filed on Nov. 13, 2017.

(51) Int. Cl.
| | |
|---|---|
| *G06F 17/00* | (2019.01) |
| *G06F 40/103* | (2020.01) |
| *G06F 16/11* | (2019.01) |
| *G06F 16/13* | (2019.01) |
| *G06F 40/18* | (2020.01) |
| *G06F 40/194* | (2020.01) |
| *G06F 40/197* | (2020.01) |

(52) U.S. Cl.
CPC .......... *G06F 40/103* (2020.01); *G06F 16/116* (2019.01); *G06F 16/13* (2019.01); *G06F 40/18* (2020.01); *G06F 40/194* (2020.01); *G06F 40/197* (2020.01)

(58) Field of Classification Search
CPC .. G06F 21/6218; G06F 17/246; G06F 40/103; G06F 16/116; G06F 40/18; G06F 16/13
USPC .......................... 715/213, 200, 212, 217–218
See application file for complete search history.

(56) References Cited

U.S. PATENT DOCUMENTS

| | | | |
|---|---|---|---|
| 5,499,180 A | 3/1996 | Ammirato | |
| 5,806,078 A | 9/1998 | Hug | |
| 6,560,620 B1 | 5/2003 | Ching | |
| 6,658,626 B1 | 12/2003 | Aiken | |
| 7,087,444 B2 | 8/2006 | Wong | |
| 7,146,561 B2* | 12/2006 | Bauchot | G06F 17/246 715/212 |
| 7,496,841 B2 | 2/2009 | Hadfield | |
| 7,650,355 B1 | 1/2010 | Davis | |
| 8,315,997 B1 | 11/2012 | Peled | |
| 8,527,864 B2* | 9/2013 | Massand | G06F 17/2211 715/209 |
| 8,666,953 B2* | 3/2014 | Semerdzhiev | G06F 16/10 707/696 |
| 2002/0023106 A1 | 2/2002 | Bauchot | |
| 2003/0023961 A1 | 1/2003 | Barsness | |

(Continued)

OTHER PUBLICATIONS

DB solo, Table Data Comparison Tool, published Sep. 20, 2017 via Wayback machine, pp. 1-4 (pdf).*

*Primary Examiner* — Manglesh M Patel
(74) *Attorney, Agent, or Firm* — Nixon Peabody LLP

(57) ABSTRACT

A method and system for displaying the comparison output of two versions of a spreadsheet document such that the source formatting of the spreadsheet can be selectively suppressed to enhance the legibility of the comparison output.

21 Claims, 4 Drawing Sheets
(2 of 4 Drawing Sheet(s) Filed in Color)

Source Formatting Hidden

(56) References Cited

U.S. PATENT DOCUMENTS

| | | | |
|---|---|---|---|
| 2003/0233296 A1* | 12/2003 | Wagner | G06F 17/243 |
| | | | 705/31 |
| 2004/0085354 A1 | 5/2004 | Massand | |
| 2004/0153469 A1 | 8/2004 | Keith-Hill | |
| 2004/0230616 A1 | 11/2004 | Kruy | |
| 2005/0010863 A1 | 1/2005 | Zernik | |
| 2005/0015716 A1 | 1/2005 | Lavoie | |
| 2005/0050088 A1* | 3/2005 | Kotler | G06F 17/245 |
| 2005/0097464 A1 | 5/2005 | Graeber | |
| 2005/0240858 A1* | 10/2005 | Croft | G06F 17/2211 |
| | | | 715/229 |
| 2006/0129913 A1* | 6/2006 | Vigesaa | G06F 40/18 |
| | | | 715/250 |
| 2006/0259524 A1 | 11/2006 | Horton | |
| 2007/0011211 A1 | 1/2007 | Reeves | |
| 2007/0050700 A1* | 3/2007 | Simkhay | G06F 40/18 |
| | | | 715/220 |
| 2007/0088733 A1* | 4/2007 | Bodge | G06F 16/22 |
| 2008/0104016 A1 | 5/2008 | Atmaja | |
| 2008/0178117 A1 | 7/2008 | Gelman | |
| 2008/0222508 A1 | 9/2008 | Nguyen | |
| 2009/0157679 A1 | 6/2009 | Elias | |
| 2009/0271401 A1 | 10/2009 | Powell, Jr. | |
| 2009/0327851 A1* | 12/2009 | Raposo | G06F 16/21 |
| | | | 715/213 |
| 2010/0049745 A1 | 2/2010 | Aebig | |
| 2010/0174678 A1* | 7/2010 | Massand | G06F 40/18 |
| | | | 707/610 |
| 2010/0241943 A1* | 9/2010 | Massand | G06F 40/18 |
| | | | 715/227 |
| 2012/0192051 A1* | 7/2012 | Rothschiller | G06F 16/26 |
| | | | 715/217 |
| 2013/0339832 A1* | 12/2013 | Simkhay | G06F 40/18 |
| | | | 715/217 |
| 2014/0033101 A1 | 1/2014 | Rein | |
| 2016/0275150 A1* | 9/2016 | Bournonnais | G06F 16/24575 |

\* cited by examiner

Fig1: Source Formatting Hidden

Fig. 2: Source Formatting Shown

METHOD OF COMPARING TWO DATA TABLES AND DISPLAYING THE RESULTS WITHOUT SOURCE FORMATTING

PRIORITY CLAIM

This application claims priority as a non-provisional application of U.S. Pat. App. No. 62/591,877, filed on Nov. 29, 2017; U.S. Pat. App. No. 62/587,968, filed on Nov. 17, 2017 and U.S. Pat. App. No. 62/585,212, filed on Nov. 13, 2017, all of which are hereby incorporated by reference in their entireties for all that they teach.

FIELD OF INVENTION

The invention relates to the comparison of two documents that are two corresponding versions of a data table, typically a spreadsheet. Ordinarily, comparison processes operated on a computer present too much information about the comparison of the two documents rendering the result difficult for the viewer or user to discern the changes. The invention described below allows the user to toggle on and off various elements of a spreadsheet source formatting function in order to allow the user to focus on the areas of change rather than attempting to understand the difference between the source formatting and the formatting used to identify change. At the same time, it allows the user to show the source formatting in case they need to understand more detail and context about a spreadsheet.

BACKGROUND

In many business situations, it is common for spreadsheets to contain formatting such as cell fill colors, font styles, borders and other visual elements. There is a need in many business environments to compare different versions of these spreadsheets in order to identify any changes that have been made between them. Although there are existing applications that can compare documents, including spreadsheets, none seem to solve the problem of being able to clearly identify changes in a formatted spreadsheet.

Existing prior art solutions tend to overlay a spectrum of colors to indicate that a particular cell has been changed. For example, some prior art solutions present areas of change that are indicated using color rectangles overlaying cells that have a change detected between the two compared versions. The problem with this solution is that the colors used to indicate change often conflict with the spreadsheet source formatting in the document, leading to the user wasting valuable time having to discern which cells have changed values and which cells that have source formatting using the same indicator. The visual design can also be incredibly busy to the user's eyes and from a user experience point of view, lead to an increase in cognitive load.

FIG. 2 is a screenshot of the output after comparing two versions of a spreadsheet that contains source formatting. At first glance, it is already incredibly difficult to determine exactly where the changes are. The color yellow for example has been used in both the source formatting and in the output to indicate a change type by the application, making it incredibly difficult for the user to quickly distinguish cells that have changed from cells that haven't.

This problem is compounded further in the case where the source formatting is similar to the colors used to identify change. In the example shown above, a cell with a particular change type has been identified using a particular shade of yellow, and that similar shade of yellow has been chosen by the user in the source formatting for the document, which makes discerning the difference between the detected changes in the document and its source formatting appearance difficult. There is very little indication that two different cells, one with a change that has been indicated with a color and another with source formatting that is similar, are different and leads to the user having to investigate further.

As a result, the multi-colored spectrum also forces the user to learn all of the colors used by the application to identify change and work out which colors are part of the source formatting and which are being used to identify change.

There is also a scenario for users who have older and poor quality, limited color space output or smaller displays, where colors that may be different appear to look identical. This makes the distinction between a cell that has been changed and the original source formatting even more difficult to distinguish.

The alternative some software solutions provide is not even including the source formatting as part of their comparison. Although this makes identifying changes much easier, the user loses all of the source formatting of their spreadsheet that would otherwise be used to provide context to the spreadsheet. This solution in most business situations is less than ideal since the source formatting is an incredibly important part of a spreadsheet, providing another level of detail. The source formatting of a spreadsheet is often used to give context to the detail within the spreadsheet and can alter the overall purpose of the spreadsheet if it were permanently removed. In many examples, the source formatting in a spreadsheet can be used to draw the users attention to important content in the spreadsheet such as profits versus losses.

The difficulty in understanding what exactly has changed between one version of a spreadsheet to another is the complexity in displaying what has changed in a clear way to the user while at the same time, not conflicting with the source formatting applied to the spreadsheet. Existing software is insufficient to fill this need. The colors and other visual elements used to identify change often conflict with spreadsheet source formatting leading to a messy experience that provides more work for the user.

Other software, which does not include source formatting in their comparison is lacking the detail source formatting provides that is necessary for users to understand the context behind the spreadsheet.

The problem facing a user comparing two versions of a spreadsheet is this: having just compared two versions of a spreadsheet that contains source formatting, the user cannot easily identify which cells contain changes. Color and other formatting elements which could be used to indicate change would instead add complexity to that spreadsheet.

In these circumstances, a design experience capable of hiding and showing the source formatting of a spreadsheet when needed so that the user only sees areas of change would be extremely valuable, helping to avoid common time-wasting tasks otherwise necessary to identify and understand changes. The solution would allow users to experience the best of both worlds where they can focus on the changes that have been made to a spreadsheet by hiding source formatting or understand what the result of a change means to the overall spreadsheet by showing the source formatting.

DESCRIPTION OF THE FIGURES

The headings provided herein are for convenience only and do not necessarily affect the scope or meaning of the claimed invention. In the drawings, the same reference numbers and any acronyms identify elements or acts with the same or similar structure or functionality for ease of understanding and convenience. To easily identify the discussion of any particular element or act, the most significant digit or digits in a reference number refer to the Figure number in which that element is first introduced (e.g., element 101 is first introduced and discussed with respect to FIG. 1). The patent or application file contains at least one drawing executed in color. Copies of this patent or patent application publication with color drawing(s) will be provided by the Office upon request and payment of the necessary fee.

FIG. 1 shows an image showing a user interface displaying a spreadsheet comparison output where the source formatting is hidden and the comparison formatting is presented. The user interface shows the selection button for turning source formatting on and off.

FIG. 2 shows an image showing the table comparison output with the source formatting turned on and also showing comparison formatting indicating changes in the document.

DETAILED DESCRIPTION

Figure 3:
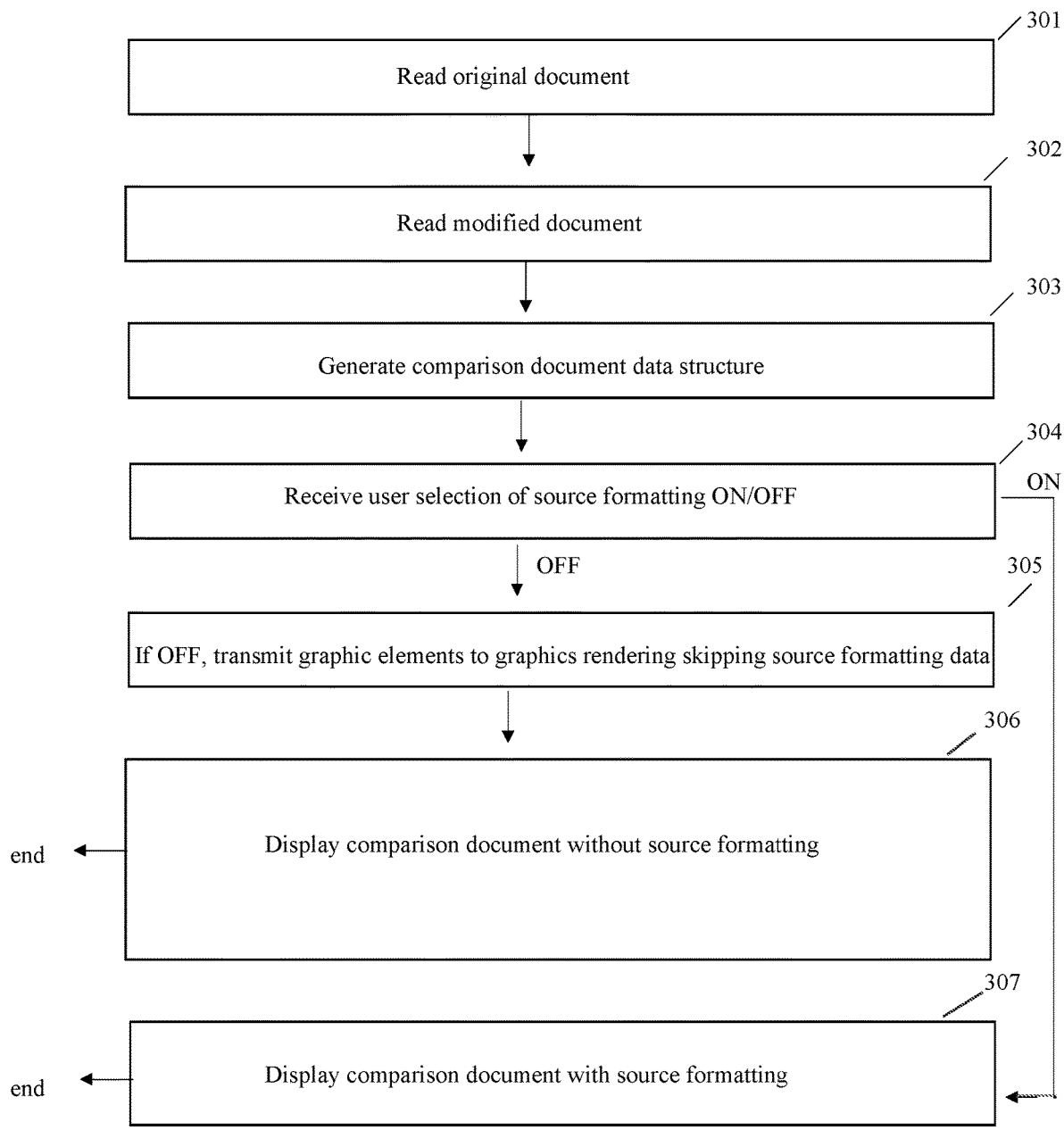
FIG. 3 shows an exemplary process.
Figure 4:
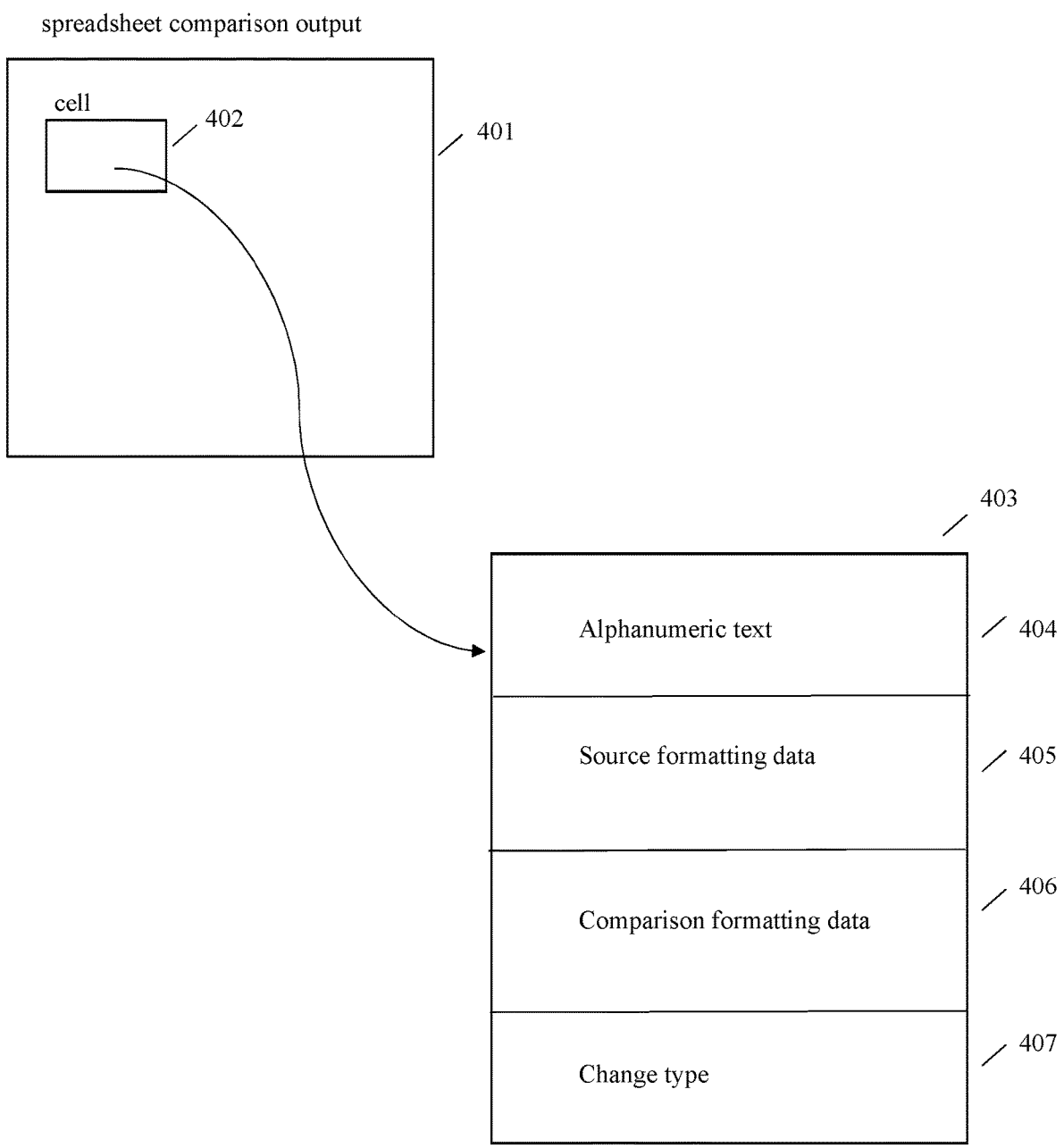
FIG. 4 shows an exemplary comparison data structure.

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other features not described in detail herein. Additionally, some well-known structures or functions may not be shown or described in detail below, so as to avoid unnecessarily obscuring the relevant description. The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

The invention describes a design solution with a number of key components:

The ability to receive from an operator input into the user interface on the user's computer that when processed by the invention causes a toggle on or off all or specific parts of a spreadsheets source formatting including:

Cell fill color and styles

Cell border color and styles

Font family, size, color and style such as bold, italic and underlined

Cell text alignment and orientation.

Data formatting such as number formats, decimal styles, etc.

A single user interaction through the displayed user interface such as a button or keyboard shortcut that allows the user to toggle on and off all or specific parts of a spreadsheets source formatting.

A series of user interactions through the user interface displayed on the user's computer such as a series of buttons or keyboard shortcuts that allows the user to toggle on and off specific parts of a spreadsheets source formatting.

A single user interaction through the user interface displayed on the user's computer such as a button or keyboard shortcut that can be configured to toggle on and off all or specific parts of a spreadsheets source formatting.

Figure 1:
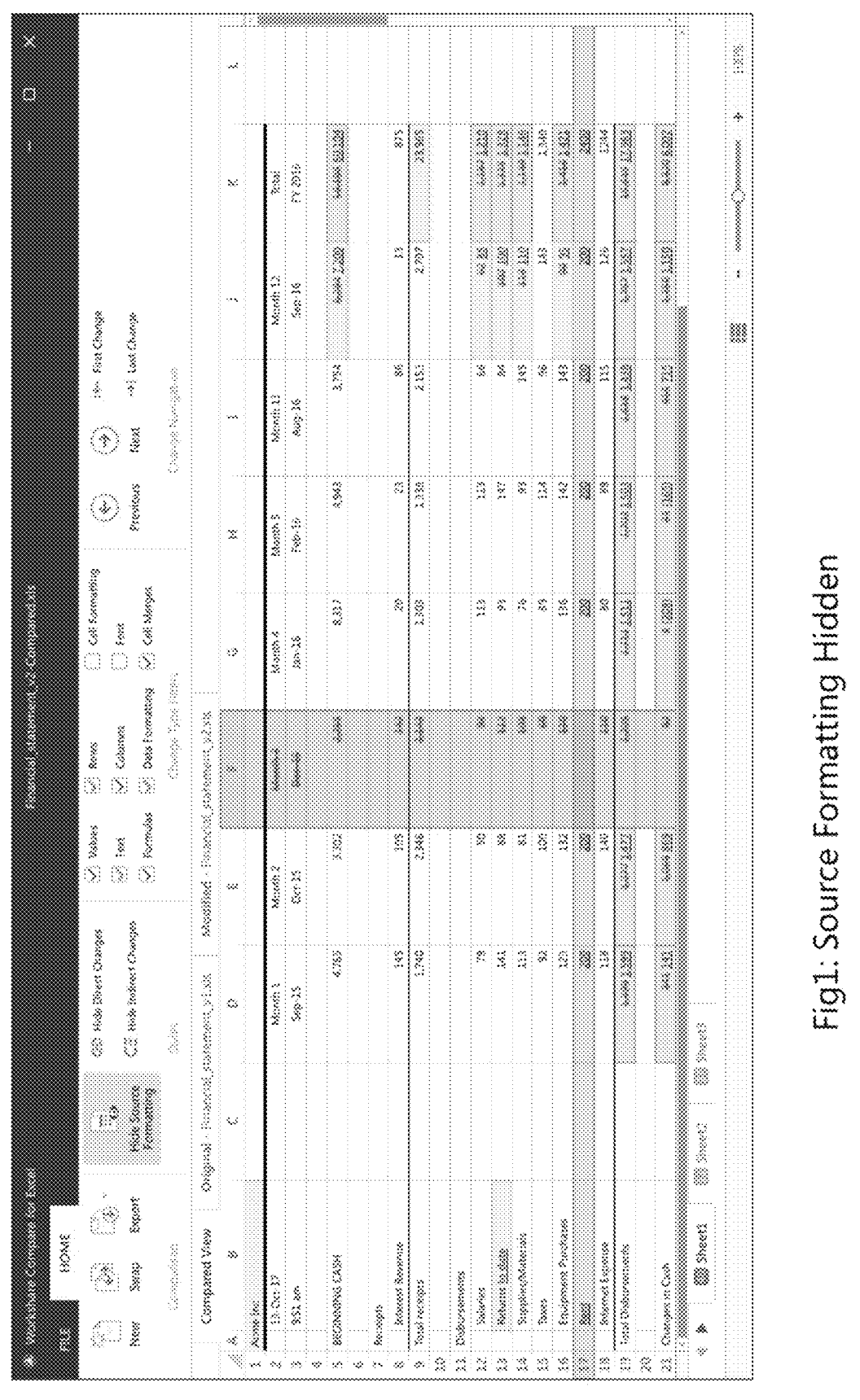

In one embodiment, the document comparison output is processed by the invention in order to produce a data structure that when displayed on the user interface of the user's computer the source formatting is hidden by default. See FIG. 1. The user then has the ability to toggle it on and then off again. The following steps may be performed in accordance with the invention:

1. The user launches the computer program, application or system embodying the invention to run on their computer, or on a server in combination with their computer.

2. The system displays on the user's computer a user interface that can present output and also receive input from the user, for example, the user may utilize file directory functions to input selections of an original document and a modified document.

3. The user then clicks or selects an interaction that causes the system to begin the comparison process that detects changes between the versions of the document generates an output data structure that can be further utilized by the invention to provide the selectable viewing of the comparison result output. The data structure (as further described below) organizes the comparison data output in order that the comparison output visualization can be selected by the user. In one embodiment, the source formatting information is maintained in the data structure, but in a particular way that it can be ignored or expressed, depending on the selection of the user.

3. Once the comparison is complete, the user can be presented by the system displaying on the user's computer display output a compared view that visually shows the changes between the original and modified document (redline view) that combines the original and modified documents into a single view and uses a defined spectrum of colors to identify different change types for the specific detected changes between the versions. See FIG. 2.

Figure 2:
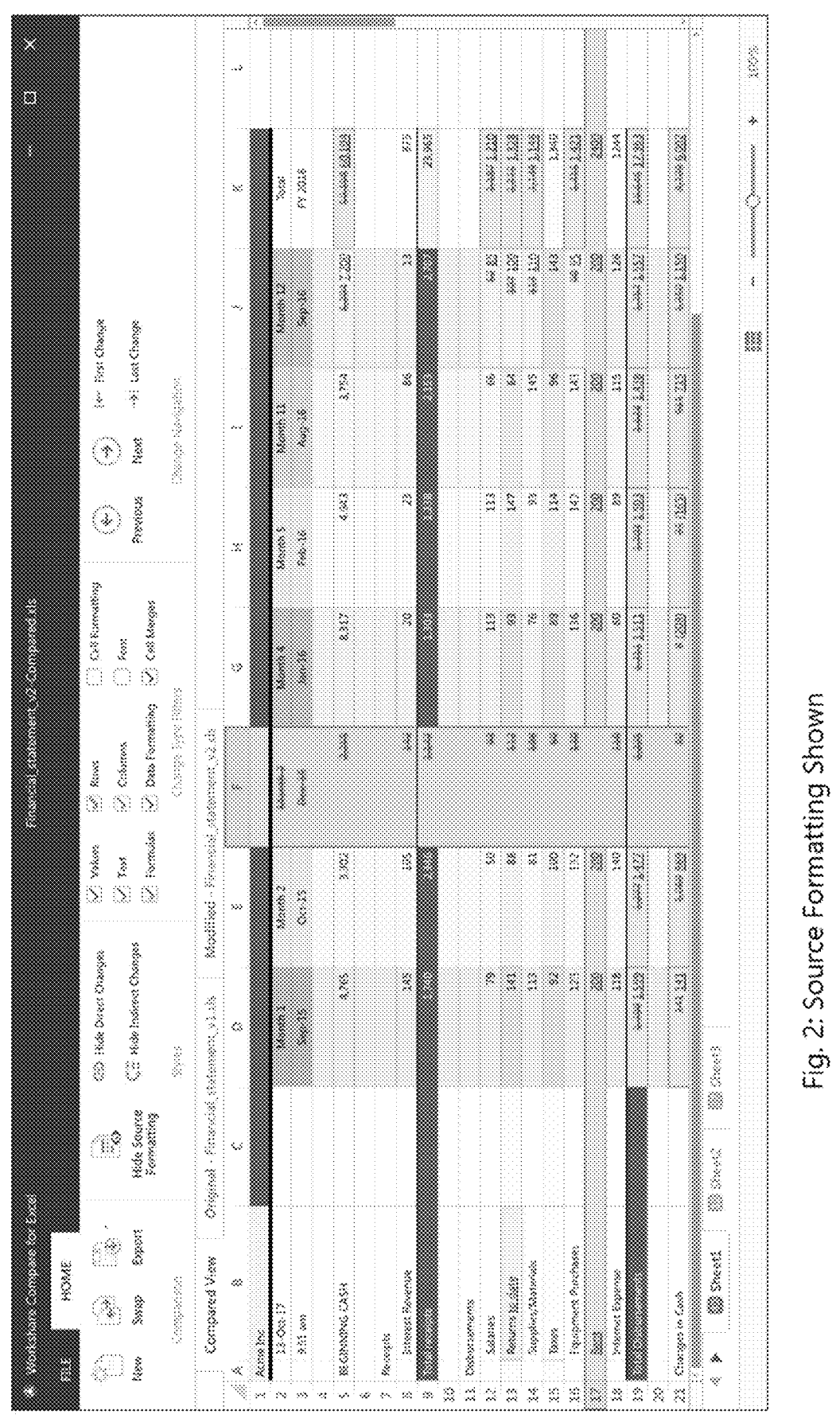

4. At this point, all or some of the source formatting is hidden from view, as shown in FIG. 2. At this step, the invention generates display output data from the comparison output data structure using logic that skips over or ignores the source formatting data that was found in the documents.

5. The user may click on a button or uses a keyboard shortcut in the user interface that is received by the invention that modifies the logic path so that the display data includes all or some of the source formatting that was hidden. In this case the user selected input into the system causes the logic of the invention to express some or all of the source formatting data.

6. The user can then click on a button or use a keyboard shortcut to again hide all or some of the source formatting. In this case, the logic of the invention then skips expressing the source formatting data into the display data.

In a second embodiment, the document comparison output is processed by the invention in order to produce a data structure that when rendered to be displayed on the user interface of the user's computer the source formatting is shown by default. See FIG. 2. The user then has the ability to toggle it off and then on again. The following steps may be performed in accordance with the invention:

1. The user launches the computer program, application or system embodying the invention to run on their computer, or on a server in combination with their computer.

2. The system displays on the user's computer a user interface that can present output and also receive input from the user, for example, the user may utilize file directory functions to input selections of an original document and a modified document.

3. The user then clicks or selects an interaction that causes the system to begin the comparison process that detects changes between the versions of the document generates an output data structure that can be further utilized by the invention to provide the selectable viewing of the comparison result output. The data structure organizes the comparison data output in order that the comparison output visualization can be selected by the user.

4. Once the comparison is complete, the user can be presented by the system displaying on the user's computer display output with a compared view that visually shows the changes between the original and modified document (redline view) that combines the original and modified documents, including the source formatting into a single view and overlays a defined spectrum of colours to identify different change types for the specific detected changes between the versions. See FIG. 2.

5. The user may click on a button or use a keyboard shortcut in the user interface that is received by the invention that modifies the logic path so that the display data that hides all or some of the source formatting. In this case the user selected input into the system causes the logic of the invention to express some or none of the source formatting data.

6. The user can then click on a button or use a keyboard shortcut to again show the source formatting. In this case, the logic of the invention then expresses the source formatting data into the display data.

In a third embodiment, the document comparison output is processed by the invention in order to produce a data structure that when displayed on the user interface of the user's computer the source formatting is hidden by default. See FIG. 1. The user has the ability to configure what source formatting is hidden and shown, when a button or keyboard shortcut is toggled. The following steps may be performed in accordance with the invention:

1. The user launches the computer program, application or system embodying the invention to run on their computer, or on a server in combination with their computer 2. The system displays on the user's computer a user interface that can present output and also receive input from the user, for example, the user may utilize file directory functions to input selections of an original document and a modified document.

3. The user then clicks or selects an interaction that causes the system to begin the comparison process that detects changes between the versions of the document generates an output data structure that can be further utilized by the invention to provide the selectable viewing of the comparison result output. The data structure organizes the comparison data output in order that the comparison output visualization can be selected by the user. In one embodiment, the source formatting information is maintained in the data structure, in a particular way that it can be displayed, depending on the selection of the user.

4. Once the comparison is complete, the user can be presented by the system displaying on the user's computer display output with a compared view that visually shows the changes between the original and modified document (redline view) that combines the original and modified documents, including the source formatting into a single view and overlays a defined spectrum of colours to identify different change types for the specific detected changes between the versions. See FIG. 2.

5. The user may click on a button or use a keyboard shortcut in the user interface that is received by the invention that modifies the logic path so that the display data configures what formatting is hidden and shown from a settings or configuration section in the application. In this case, the logic of the invention then expresses the source formatting data into the display data.

6. The user can then configure exactly what source formatting is hidden and shown when the user clicks on a button or keyboard shortcut. This configuration can be stored in a file so that each time the user launches the invention, the display of the comparison defaults to the pre-defined configuration that is represented by the data stored in the configuration file.

In a fourth embodiment, the document comparison output is processed by the invention in order to produce a data structure displayed on the user interface of the user's computer, which the user then has a range of buttons or keyboard shortcuts that can be toggled to hide or show a range of different source formatting options. The following steps may be performed in accordance with the invention:

1. The user launches the computer program, application or system embodying the invention to run on their computer, or on a server in combination with their computer 2. The system displays on the user's computer a user interface that can present output and also receive input from the user, for example, the user may utilize file directory functions to input selections of an original document and a modified document.

3. The user then clicks or selects an interaction that causes the system to begin the comparison process that detects changes between the versions of the document generates an output data structure that can be further utilized by the invention to provide the selectable viewing of the comparison result output. The data structure organizes the comparison data output in order that the comparison output visualization can be selected by the user. In one embodiment, the source formatting information is maintained in the data structure, in a particular way that it can be displayed, depending on the selection of the user.

4. Once the comparison is complete, the user can be presented by the system displaying on the user's computer display output with a compared view that visually shows the changes between the original and modified document (redline view) that combines the original and modified documents, including the source formatting into a single view and overlays a defined spectrum of colours to identify different change types for the specific detected changes between the versions. See FIG. 2.

5. The user may click on a range of buttons or use a keyboard shortcut or other interaction in the user interface that is received by the invention that modifies the logic path so that the display data configures what formatting is hidden and shown from a settings or configuration section in the application. In this case, the logic of the invention then determines which, if any, of the source and comparison formatting data are expressed into the display data as selected by the user.

Visual inspection of FIG. 2 shows that, it is clear that the first output, in FIG. 1, is much easier for the user to understand what has changed and where to focus their attention. The first option, an example shown in FIG. 2, is much more complicated and requires a lot more effort from the user in order to comprehend what changes were made to the document between the two versions.

The method involves handling formatting data that is incorporated into spreadsheet files in a special way. In one embodiment, all of the source formatting data from the spreadsheet is removed and stored in a data structure where for each cell in the spreadsheet, there is a data element in the data structure that contains formatting data that applies to that cell. The data structure may be comprised of N records, for N cells in the spreadsheet. Each record may have a cell identifier, which identifies its location in the spreadsheet by row and column. Alternatively or as an additional element, there may be a pointer in the data structure that maps the record to the cell in the spreadsheet. The cell is further comprised of the formatting data for that cell. When the comparison is conducted, the data in a given cell in the first version of the data table or spreadsheet is compared to the same cell but in the second version of the data table or spreadsheet. The program logic can operate in one embodiment as a loop or nested loop that visits each cell to be compared between the two versions of the data table. The process first parses the current cell and recovers substantive alphanumeric text from both cells of the two versions of the data table. The logic can compare the alphanumeric data on a character by character basis, and thereby generate a comparison data which may indicate which are then new characters that were added into the revised cell, and which characters in the original version of the cell were deleted from the revised cell. The delineation may be inserted into the text string by means of control characters that ultimately are not displayed. Within the loop for a particular cell comparison, the result string for each comparison of a cell starts as null. The program compares the character strings comprising the two cells, on a character by character basis. If the same character string is detected in both, then the character string is concatenated onto the result string. If a character string is detected as deleted from the second version, a deletion control character is concatenated onto the result string, then the deleted character string and then a stop deletion control character concatenated. Likewise, if an added character string is detected, an insertion control character is concatenated onto the result string, then the added characters string and then a stop insertion control character. This is finished when the last of the longest of the first or second version of the cell contents is reached. This result string is stored in the comparison output data structure within the data record corresponding to the cell being compared. Within that cell, the comparison result is stored in its own data element. The source formatting data for that cell, which may be globally applied for the entire data table, or specified for that cell, is stored in another element in the data record. The comparison process for that cell also creates a comparison formatting data, which indicates how the deleted characters or added characters and the status of the cell should be indicated, that is when rendered, how the control characters indicating an insertion or deletion are to be graphically rendered, for example, as strikethrough or underline. Once that is complete for a first cell, the program increments a counter which then starts the loop again but with a pointer or address referring to the next cell in the data table, and the process repeats until all cells have been processed. In this embodiment, the spreadsheets are compared, and then the result can be displayed without any formatting, or limited to formatting that indicates the results of the comparison, or, if based on user input selections, additional source formatting retrieved from the data structure on a selective basis. For example, the rendering engine that presents the comparison output as an image for display can receive from the user a selection to not display color fills on the cells. The rendering engine can then display the output comparison spreadsheet and determine whether to express the color fills in the cells based on mapping the cells by their address (e.g. B-26, i.e. row and column) into the source formatting data structure, and fetching the formatting data for that cell, and ignoring the color fill requirement. In another embodiment, the comparison output structure or file can contain for each cell a pointer to a data element in the formatting data structure where formatting data is to be fetched.

In another embodiment, the comparison output data is held in a data structure that permits a program that displays the compared spreadsheet result to be presented to the user by rendering the data in the output data structure. Given that the user may want to preserve the result, the system can also generate from the resulting output presentation output files. In one embodiment, the rendering result is transformed into an image file, for example, a TIFF file, or even a document type of file, for example a PDF file or a new spreadsheet file. In this embodiment, the user selects which formatting to use and then the output document is rendered for presentation using the users selected input. The user can then select that the presented result be preserved as a PDF file and the system will then generate the PDF output with the selected formatting. In another embodiment, the system generates a new spreadsheet data file, for example, an XLS file compatible with Microsoft™ Excel™. In this embodiment, the spreadsheet data file is populated with the formatting data selected by the user.

In yet another embodiment, a specialized comparison output file is created that contains the data that is in the comparison output data file as well as the data in the formatting data structure. In this embodiment, each record in the data structure would correspond to a cell in the spreadsheet and be comprised of the comparison output for that cell in one element as well as the formatting data in another element. This specialized comparison file can then be opened by the system again and the same presentation functions made available. Alternatively, the specialized comparison file can be transmitted to another user that has the same computer program, and they can open the comparison output file and utilize the selective formatting presentation function. When opened, the system parses the specialized comparison file to recreate the comparison output data structure in memory. The invention would successively process each record in the comparison output data structure to generate display output data. Then, the system can then be utilized to selectively redisplay the result based on the selection of the formatting parameters input by the user for example, to display source formatting or suppress it.

The source formatting selection functionality operates as a result of the spreadsheet cells having one or more formatting commands specified for them. For example, some cells may be comprised of a color fill designation, which designates a selected color as the background to the cell. Some may be comprised of an alpha numeric text font designation, or with a particular color. The text may be designated as underlined, or struck-through. The alphanumeric text may specify dollar signs, or decimals, or percentages. The formatting may include the position of the text in the cell. The system can present the user with a comparison output that has no formatting, that is, the simplest black and white boxes and plain text. In addition, the user interface can list a set of format types used by the source formatting, for example, background color, font type, text color. These may be presented in a dialogue box of the user interface as radio buttons for selection. The system reviews the formatting data structure to identify the formatting that is used and then populates the choices available in the dialogue box. When the user makes selections and enters them into the user interface, for example, by pressing an "OK" button, the system renders the comparison output spreadsheet utilizing the selected formatting data while ignoring the rest. The rendering involves processing the comparison output data structure and the formatting data selected to be expressed in order to create a new display output that is rendered for display on the user's device.

The data structure holding the formatting data can be generated in a variety of ways:

First, a separate data structure for the source spreadsheet may be created. In this case, for each cell there is a destination element in the data structure that has the formatting data for that cell. More than one cell may be associated with the same destination element. In another embodiment, there may be more than one formatting element that applies to a cell. For example, some cells may have no color, some a background color, and some a background color and colored text. As a result, there may be a cell that is associated with an element in the formatting data structure that encodes no color, a cell that is associated with the background color element, and a third that is associated with two: background color and an element representing colored text. In yet another embodiment, the output comparison data structure may have for each cell in the data structure one or more pointers to the relevant elements in the formatting data structure.

Second, the formatting data structure could have an element for each cell in the spreadsheet. Each element would have the formatting data for the cell that it is uniquely associated with.

Other techniques involve a formatting data structure with data elements defining one format appearance, and all cells that are to look like that will point to that data element. There could have multiple formatting pointers for a cell so that the system can combine format commands. Another embodiment utilizes a mapping data structure that contains the list of all combinations of formatting elements used in the spreadsheet, and for each of those elements, a list of pointers to the formatting data structure and in each cell it points to which of the combination elements that cell applies. An alternative embodiment encodes a data element that defines a region in the XLS, and the formatting to be applied to that region. These data elements may but probably cannot overlap.

Finally, there is an embodiment where the output comparison data structure carries along the source formatting from the first version of the spreadsheet document or based on a user selection input, the source formatting of the second version of the document that is being compared. In this way, each record in the output comparison data structure corresponds to a cell in the spreadsheet. Each record is comprised of the comparison cell data as an element of the record as well as the formatting data as another element of the record. In this embodiment, the process that displays the comparison output to the user deals with the formatting selection and generates the display in response to the user selection. In one embodiment the system generates in computer memory a comparison output data structure comprised of comparison output data produced by a comparison of the first and second version, said data structure organized on a cell by cell basis so that each cell in the data table is represented by an at least one corresponding record in the data structure, the data structure being further comprised of a source formatting data organized on a cell by cell basis that is separable from a comparison formatting data that are organized on a cell by cell basis.

Once comparison of document versions is completed by the processor, for each cell in the comparison spreadsheet document, (401) the cell for the comparison (402) will have a data structure (403) containing: old, new and deleted text, (404), formatting data from the source (405), formatting that relates to the result of the comparison, e.g. which text is redlined as an insertion or struck through, as a deletion, and also has at least one formatting objects that refer to the formatting for the original and modified source formatting in the file, (406). There may also be a change type, for example, cell insertion, cell deletion, direct change or indirect change. (407). In addition, the system can detect a user selection to display to turn off the source formatting from the original or modified document. That is, the comparison output data structure has at least two categories of formatting data: formatting data carried in from the source documents themselves, and formatting data associated with presenting the comparison result. An example of the latter would be strikethrough and underline of the alphanumeric text in the cell.

Fundamentally, there is at least one data structure representing the comparison output data in combination with both comparison formatting data and source formatting data. Further, the at least one data structure is organized so that the comparison output formatting data is separated from the source formatting data, whether by being stored in distinct locations in the data structures from the comparison formatting data or as a result of a tag appended to the formatting data that identifies it as source formatting data or comparison formatting data. By maintaining a distinction between the two types of formatting data, the invention's logic can process the comparison output data to produce a display output that selectively displays the source formatting and comparison formatting depending on the input selections made by the user that drive the logic. The separation of source formatting from comparison formatting may be accomplished several ways. First, the output data structure is organized such that the source formatting is stored in a first subset of the at least one data records and the comparison formatting data is stored in a non-overlapping second subset of the at least one data records. Second, the source formatting data and the comparison formatting data for each cell in the output comparison data structure can be stored in the same data record such that the source formatting data is stored in a first data element comprising the data record and the comparison formatting data is stored in a second data element comprising the data record. Third, the source formatting data and the comparison formatting data for each cell in the output comparison data structure are stored in the same data record comprising the data structure where the source formatting data and comparison formatting data are encoded in order that by logical processes, each may be categorized as one or the other type of data. For example, each formatting data can be appended with a tag that indicates whether it is of one type or the other. Encoding these two logical states is accomplished using one bit. As the display output data is processed, the process can receive all of the formatting data and using a branching statement, choose to ignore the source formatting data based on the value of that appended bit.

The rendering engine then presents the comparison output by utilizing the comparison output data structure. (401) Display processing module issues commands to the underlying computer system to display graphics elements on the screen based on the text and the formatting commands. These graphics elements are the elements that make up the presentation and display of the spread sheet. A first category of formatting data applies, which is the minimum graphical elements necessary to show an unformatted spreadsheet. These may include boxes, lines and plain text. When all formatting is turned off as a result of the user's selection into the user interface, these minimal baseline graphic elements are still utilized to present the unformatted spreadsheet. These elements may be considered essential (boxes, lines, text, text type is plain, text color is black). A second category of graphics elements that are not used when displaying an unformatted spreadsheet can include: color fill, bordering, custom fonts, custom size. As noted above, a third category of graphics elements are those necessary to present the comparison itself, for example, strike through and underline, or specific comparison color, for example, yellow for new text, red for deleted text. The user interface provides a mechanism for the user to select which of the latter two text comparison formatting are used. Further, the user can select which of the comparison essential graphics elements, can be selected. In one embodiment, the user can configure the system as to which formatting types are included in which of the three categories. The third category, the comparison formatting category, is determined by the user selecting how they want the changes in the cells presented. The user can select strikethrough and underling, or select colors indicating new or deleted text, background color or combinations. The system can store the category selection as part of the specialized comparison file output so that it may be utilized again by the same user or by another user. In this embodiment, comparison output data structure (401) would have for each cell (402) the alphanumeric text comprising the same, new or deleted text (403), source formatting data (405), and the selected comparison formatting data (406).

When a user displays the comparison result, a user interface may be made available that presents the formatting available to be shown, for example, the source formatting data types and the comparison formatting data types. See the ribbon at the top of the user interface shown on FIG. 1. Utilizing radio buttons, the user can input a selection of which of these the display engine will express. For example, the source formatting in FIG. 2 shows that the user has used the color green to highlight column E. But a similar shade of green is being used as a comparison formatting to indicate an indirect change, for example, a change in the spreadsheet formula. The same is true for column H where the user has colored the column yellow, which is also a comparison formatting similar to how a direct change is indicated. As a result, FIG. 2 shows that it is difficult to clearly distinguish between the changes and the source formatting, and also to identify what cells have actually changed.

In FIG. 1, the source formatting is suppressed, indicated by the "Hide Source Formatting" radio button being selected. The comparison formatting is:
Green: Indirect change
Yellow: Direct change
Red: Deleted cell
Blue: Inserted cell
As a result, as the computer process reaches each cell in the comparison output data structure, it can read all of the data, that is, the alphanumeric text and the formatting data, and utilize the subset of the formatting data has been selected by the user. In this case, in FIG. 1, a deleted column is shown as red (column F), an inserted row is green (Row 17), indirect changes in cells shown as yellow (Column J) and direct changes as green (Column K). For example, for cell (J, 5), the alphanumeric text is displayed, with comparison formatting of strikethrough and underlined, background color "Yellow". But because of selection logic utilizing the user's input, presents graphics elements commands that do not include displaying "Red" in that column. Without source formatting, the background may be left transparent and the text as black. Similarly, Column F is presented in FIG. 1 with a red background and its text as deleted. Without source formatting, column D, which is not deleted, is shown in FIG. 1 without a red background color. But in FIG. 2, the source formatting shows Column D with a red background-yet it is not a deleted column. In order to generate the more legible comparison display, the program issues commands to the computer system utilizing the formatting from the first category of essential formatting elements and selected comparison formatting elements. The de-selected source formatting data for each cell is ignored. Alternatively, where the text is indicated as deleted or new, the third category of formatting elements are utilized, that is, to display deleted text as strikethrough and new text as underline.

The system can therefore, provide a range of appearances to the user. The system, by means of the input selection into the user interface and the selection logic, present the comparison output with no or the minimal required formatting. It could also only present with background colors, or without background colors but with text colors. In yet another embodiment, the selection logic in the system can read the formatting commands of the comparison output cells and select between the source formatting and the comparison formatting. For example, where there has been no change, the source formatting may be used. Where there has been a change, the comparison formatting may be used. Nonetheless, there will be cases that the user will select no source formatting so as to avoid being confused as to whether a "Red" cell has been deleted or is simply being presented in source formatting. The logic can use typical conditional branching statements to selectively process formatting data or ignore the formatting data as the comparison output data is processed into display output data. The branching statement can select the flow of program control based on the logic state of the user's selection input into the user interface.

The exemplary process works as follows: the computer process reads the original spreadsheet document (301) and the revised spreadsheet document (302). The comparison process generates the comparison output data structure (401). For each cell in the comparison output, there is a portion of the data structure that is comprised of data that represents the comparison result. (403). When the process displays the comparison output, it receives as input a selection from the user interface whether to suppress or display source formatting (304). If source formatting is turned off, then the process reads through the comparison output data structure and transmits to the comparison display processing module (305) the alphanumeric text, comparison formatting and change type data (404, 406, 407) but not the source formatting data (405). The display process (306) can also access the default essential graphics elements to generate the display output.

In an alternate embodiment, all the comparison output data for a cell is read into the display processing module, but the module is comprised of programming logic that can select between using or not using the source formatting and comparison formatting, and based on the user input selection, either render the source formatting or not. In this latter embodiment, the formatting data would be stored in the comparison data structure in such a way that the display processing module would be able to recognize which is which. One way is to encode the entire set of formatting elements with unique values, such that one subset of values are comparison formatting and the other source formatting. The display module can then render or not render the source formatting by using programming logic to determine if formatting data it receives is a member of one set or the other. Another method is to define a data encoding format for formatting data, where its status is presented as a flag in the data word. For example a 16 bit word where one of the bits encodes whether the word represents source formatting or comparison formatting, two bits encode one of four change types and the remaining bits define color, and text formatting. In this manner, the display process reads each formatting data word, and using programming logic, generates the graphics commands using or ignoring the source formatting data by conditional logic that utilizes the user selection input.

Operating Environment:

The system is typically comprised of a central server that is connected by a data network to a user's computer. The central server may be comprised of one or more computers connected to one or more mass storage devices. The precise architecture of the central server does not limit the claimed invention. Further, the user's computer may be a laptop or desktop type of personal computer. It can also be a cell phone, smart phone or other handheld device, including a tablet. The precise form factor of the user's computer does not limit the claimed invention. Examples of well-known computing systems, environments, and/or configurations that may be suitable for use with the invention include, but are not limited to, personal computers, server computers, hand-held computers, laptop or mobile computer or communications devices such as cell phones, smart phones, and PDA's, multiprocessor systems, microprocessor-based systems, set top boxes, programmable consumer electronics, network PCs, minicomputers, mainframe computers, distributed computing environments that include any of the above systems or devices, and the like. Indeed, the terms "computer," "server," and the like may be used interchangeably herein, and may refer to any of the above devices and systems.

The user environment may be housed in the central server or operatively connected to it. In one embodiment, the user's computer is omitted, and instead an equivalent computing functionality is provided that works on a server. In this case, a user would log into the server from another computer and access the system through a user environment, and thereby access the functionality that would in other embodiments, operate on the user's computer. Further, the user may receive from and transmit data to the central server by means of the Internet, whereby the user accesses an account using an Internet web-browser and browser displays an interactive web page operatively connected to the central server. The server transmits and receives data in response to data and commands transmitted from the browser in response to the customer's actuation of the browser user interface. Some steps of the invention may be performed on the user's computer and interim results transmitted to a server. These interim results may be processed at the server and final results passed back to the user.

The Internet is a computer network that permits customers operating a personal computer to interact with computer servers located remotely and to view content that is delivered from the servers to the personal computer as data files over the network. In one kind of protocol, the servers present webpages that are rendered on the customer's personal computer using a local program known as a browser. The browser receives one or more data files from the server that are displayed on the customer's personal computer screen. The browser seeks those data files from a specific address, which is represented by an alphanumeric string called a Universal Resource Locator (URL). However, the webpage may contain components that are downloaded from a variety of URL's or IP addresses. A website is a collection of related URL's, typically all sharing the same root address or under the control of some entity. In one embodiment different regions of the simulated space displayed by the browser have different URL's. That is, the webpage encoding the simulated space can be a unitary data structure, but different URL's reference different locations in the data structure. The user computer can operate a program that receives from a remote server a data file that is passed to a program that interprets the data in the data file and commands the display device to present particular text, images, video, audio and other objects. In some embodiments, the remote server delivers a data file that is comprised of computer code that the browser program interprets, for example, scripts. The program can detect the relative location of the cursor when the mouse button is actuated, and interpret a command to be executed based on location on the indicated relative location on the display when the button was pressed. The data file may be an HTML document, the program a web-browser program and the command a hyper-link that causes the browser to request a new HTML document from another remote data network address location. The HTML can also have references that result in other code modules being called up and executed, for example, Flash or other native code.

The invention may also be entirely executed on one or more servers. A server may be a computer comprised of a central processing unit with a mass storage device and a network connection. In addition a server can include multiple of such computers connected together with a data network or other data transfer connection, or, multiple computers on a network with network accessed storage, in a manner that provides such functionality as a group. Practitioners of ordinary skill will recognize that functions that are accomplished on one server may be partitioned and accomplished on multiple servers that are operatively connected by a computer network by means of appropriate inter process communication. In addition, the access of the web site can be by means of an Internet browser accessing a secure or public page or by means of a client program running on a local computer that is connected over a computer network to the server. A data message and data upload or download can be delivered over the Internet using typical protocols, including TCP/IP, HTTP, TCP, UDP, SMTP, RPC, FTP or other kinds of data communication protocols that permit processes running on two respective remote computers to exchange information by means of digital network communication. As a result a data message can be one or more data packets transmitted from or received by a computer containing a destination network address, a destination process or application identifier, and data values that can be parsed at the destination computer located at the destination network address by the destination application in order that the relevant data values are extracted and used by the destination application. The precise architecture of the central server does not limit the claimed invention. In addition, the data network may operate with several levels, such that the user's computer is connected through a fire wall to one server, which routes communications to another server that executes the disclosed methods.

The invention may also be practiced in distributed computing environments where tasks are performed by remote processing devices that are linked through a communications network. In a distributed computing environment, program modules may be located in both local and remote computer storage media including memory storage devices. Practitioners of ordinary skill will recognize that the invention may be executed on one or more computer processors that are linked using a data network, including, for example, the Internet. In another embodiment, different steps of the process can be executed by one or more computers and storage devices geographically separated by connected by a data network in a manner so that they operate together to execute the process steps. In one embodiment, a user's computer can run an application that causes the user's computer to transmit a stream of one or more data packets across a data network to a second computer, referred to here as a server. The server, in turn, may be connected to one or more mass data storage devices where the database is stored. The server can execute a program that receives the transmitted packet and interpret the transmitted data packets in order to extract database query information. The server can then execute the remaining steps of the invention by means of accessing the mass storage devices to derive the desired result of the query. Alternatively, the server can transmit the query information to another computer that is connected to the mass storage devices, and that computer can execute the invention to derive the desired result. The result can then be transmitted back to the user's computer by means of another stream of one or more data packets appropriately addressed to the user's computer. In one embodiment, a relational database may be housed in one or more operatively connected servers operatively connected to computer memory, for example, disk drives. In yet another embodiment, the initialization of the relational database may be prepared on the set of servers and the interaction with the user's computer occur at a different place in the overall process.

The method described herein can be executed on a computer system, generally comprised of a central processing unit (CPU) that is operatively connected to a memory device, data input and output circuitry (IO) and computer data network communication circuitry. Computer code executed by the CPU can take data received by the data communication circuitry and store it in the memory device. In addition, the CPU can take data from the I/O circuitry and store it in the memory device. Further, the CPU can take data from a memory device and output it through the IO circuitry or the data communication circuitry. The data stored in memory may be further recalled from the memory device, further processed or modified by the CPU in the manner described herein and restored in the same memory device or a different memory device operatively connected to the CPU including by means of the data network circuitry. The CPU may perform logic comparisons of one or more of the data items stored in memory or in the cache memory of the CPU, or perform arithmetic operations on the data in order to make selections or determinations using such logical tests or arithmetic operations. The process flow may be altered as a result of such logical tests or arithmetic operations so as to select or determine the next step of a process. The memory device can be any kind of data storage circuit or magnetic storage or optical device, including a hard disk, optical disk or solid state memory. The IO devices can include a display screen, loudspeakers, microphone and a movable mouse that indicate to the computer the relative location of a cursor position on the display and one or more buttons that can be actuated to indicate a command.

The computer can display on the display screen operatively connected to the I/O circuitry the appearance of a user interface. Various shapes, text and other graphical forms are displayed on the screen as a result of the computer generating data that causes the pixels comprising the display screen to take on various colors and shades or brightness. The user interface may also display a graphical object referred to in the art as a cursor. The object's location on the display indicates to the user a selection of another object on the screen. The cursor may be moved by the user by means of another device connected by I/O circuitry to the computer. This device detects certain physical motions of the user, for example, the position of the hand on a flat surface or the position of a finger on a flat surface. Such devices may be referred to in the art as a mouse or a track pad. In some embodiments, the display screen itself can act as a trackpad by sensing the presence and position of one or more fingers on the surface of the display screen. When the cursor is located over a graphical object that appears to be a button or switch, the user can actuate the button or switch by engaging a physical switch on the mouse or trackpad or computer device or tapping the trackpad or touch sensitive display. When the computer detects that the physical switch has been engaged (or that the tapping of the track pad or touch sensitive screen has occurred), it takes the apparent location of the cursor (or in the case of a touch sensitive screen, the detected position of the finger) on the screen and executes the process associated with that location. As an example, not intended to limit the breadth of the disclosed invention, a graphical object that appears to be a two dimensional box with the word "enter" within it may be displayed on the screen. If the computer detects that the switch has been engaged while the cursor location (or finger location for a touch sensitive screen) was within the boundaries of a graphical object, for example, the displayed box, the computer will execute the process associated with the "enter" command. In this way, graphical objects on the screen create a user interface that permits the user to control the processes operating on the computer.

In some instances, especially where the user computer is a mobile computing device used to access data through the network the network may be any type of cellular, IP-based or converged telecommunications network, including but not limited to Global System for Mobile Communications (GSM), Time Division Multiple Access (TDMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), Worldwide Interoperability for Microwave Access (WiMAX), Universal Mobile Telecommunications System (UMTS), Evolution-Data Optimized (EVDO), Long Term Evolution (LTE), Ultra Mobile Broadband (UMB), Voice over Internet Protocol (VoIP), Unlicensed Mobile Access (UMA), any form of 802.11.xx or Bluetooth.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as C, C++, C#, Action Script, PHP, EcmaScript, JavaScript, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The invention may be described in the general context of computer-executable instructions, such as program modules, being executed by a computer. Generally, program modules include routines, programs, objects, binary components that, when executed by the CPU, perform particular tasks or implement particular abstract data types and when running, may generate in computer memory or store on disk, various data structures. A data structure may be represented in the disclosure as a manner of organizing data, but is implemented by storing data values in computer memory in an organized way. Data structures may be comprised of nodes, each of which may be comprised of one or more computer memory locations into which is stored one or more corresponding data values that are related to an item being represented by the node in the data structure. The collection of nodes may be organized in various ways, including by having one node in the data structure being comprised of a memory location wherein is stored the memory address value or other reference, or pointer, to another node in the same data structure. By means of the pointers, the relationship by and among the nodes in the data structure may be organized in a variety of topologies or forms, including, without limitation, lists, linked lists, trees and more generally, graphs. The relationship between nodes may be denoted in the specification by a line or arrow from a designated item or node to another designated item or node. A data structure may be stored on a mass storage device in the form of data records comprising a database, or as a flat, parsable file. The processes may load the flat file, parse it, and as a result of parsing the file, construct the respective data structure in memory. In other embodiment, the data structure is one or more relational tables stored on the mass storage device and organized as a relational database.

The computer program and data may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed hard disk), an optical memory device (e.g., a CD-ROM or DVD), a PC card (e.g., PCMCIA card, SD Card), or other memory device, for example a USB key. The computer program and data may be fixed in any form in a signal that is transmittable to a computer using any of various communication technologies, including, but in no way limited to, analog technologies, digital technologies, optical technologies, wireless technologies, networking technologies, and internetworking technologies. The computer program and data may be distributed in any form as a removable storage medium with accompanying printed or electronic documentation (e.g., a disk in the form of shrink wrapped software product or a magnetic tape), preloaded with a computer system (e.g., on system ROM or fixed disk), or distributed from a server, website or electronic bulletin board or other communication system (e.g., the Internet or World Wide Web.) It is appreciated that any of the software components of the present invention may, if desired, be implemented in ROM (read-only memory) form. The software components may, generally, be implemented in hardware, if desired, using conventional techniques.

It should be noted that the flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Oftentimes, logic elements may be added, modified, omitted, performed in a different order, or implemented using different logic constructs (e.g., logic gates, looping primitives, conditional logic, and other logic constructs) without changing the overall results or otherwise departing from the true scope of the invention. Where the disclosure refers to matching or comparisons of numbers, values, or their calculation, these may be implemented by program logic by storing the data values in computer memory and the program logic fetching the stored data values in order to process them in the CPU in accordance with the specified logical process so as to execute the matching, comparison or calculation and storing the result back into computer memory or otherwise branching into another part of the program logic in dependence on such logical process result. The locations of the stored data or values may be organized in the form of a data structure.

The described embodiments of the invention are intended to be exemplary and numerous variations and modifications will be apparent to those skilled in the art. All such variations and modifications are intended to be within the scope of the present invention as defined in the appended claims. Although the present invention has been described and illustrated in detail, it is to be clearly understood that the same is by way of illustration and example only, and is not to be taken by way of limitation. It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable combination. It is appreciated that the particular embodiment described in the Appendices is intended only to provide an extremely detailed disclosure of the present invention and is not intended to be limiting.

The foregoing description discloses only exemplary embodiments of the invention. Modifications of the above disclosed apparatus and methods which fall within the scope of the invention will be readily apparent to those of ordinary skill in the art. Accordingly, while the present invention has been disclosed in connection with exemplary embodiments thereof, it should be understood that other embodiments may fall within the spirit and scope of the invention as defined by the following claims.

What is claimed:

1. A method executed by a computer system having a computer with a display output, the display output selectively displaying formatting data for a comparison between a first data file representing a first version of a data table and a second data file representing a second version of the data table, the data table including at least one cell, the method comprising:

storing in a computer memory the first data table file representing the first version;

storing in the computer memory the second data table file representing the second version;

generating in the computer memory a comparison output data structure, the comparison output data structure having comparison output data that is produced by the comparison between the first version and the second version, the comparison output data structure being organized on a cell by cell basis so that each cell in the data table is represented by at least one corresponding record in the comparison output data structure, the comparison output data structure further having source formatting data organized on a cell by cell basis that is separable from comparison formatting data organized on a cell by cell basis;

receiving an input value encoding a display formatting selection for the comparison output data structure, the display formatting selection causing one or more formatting elements of the comparison output data structure to change between a hidden state and a displayed state; and based on the input value for the display formatting selection,
generating and storing a display output data set using the comparison output data structure, and
expressing or not expressing in the display output data set the source formatting data or the comparison formatting data.

2. The method of claim 1, wherein the generating and storing of the display output data includes selecting a first predetermined set of formatting data associated with presentation of no formatting at all and utilizing that first predetermined set to generate the display output data set.

3. The method of claim 1, wherein the generating and storing of the display output data includes selecting a second predetermined set of formatting data associated with presentation of the comparison formatting and suppressing the source formatting data and utilizing that second predetermined set to generate the display output data set.

4. The method of claim 2, wherein the generating and storing of the display output data includes selecting a third predetermined set of formatting data associated with presentation of a subset of the source formatting data and utilizing that first predetermined set to generate the display output data set.

5. The method of claim 1, wherein the generating and storing of the display output data includes suppressing the source formatting data and expressing the comparison formatting data.

6. The method of claim 1, further comprising generating a flat graphical file that is a rendition of the display output data set expressing the comparison formatting data.

7. The method of claim 1, further comprising generating an output file in the form of a spreadsheet data file that includes the source formatting data and the comparison formatting data utilized in the generating and storing of the display output data set.

8. The method of claim 1, further comprising generating an output data file that is an encoding of the comparison output data structure, the comparison output data structure including the cell comparison data, the source formatting data, and the selected formatting data input, the output data file being parsed by another computer at a later time, the comparison output data structure being recreated in the parsing computer memory.

9. The method of claim 1, wherein the comparison output data structure is organized such that the source formatting data is stored in a first subset of at least one data records and the comparison formatting data is stored in a second subset of the at least one data records.

10. The method of claim 1, wherein the source formatting data and the comparison formatting data for each cell in the output comparison data structure are stored in a same data record corresponding to such cell, the source formatting data being stored in a first data element including the data record and the comparison formatting data being stored in a second data element including the data record.

11. The method of claim 1, wherein the source formatting data and the comparison formatting data for each cell in the output comparison data structure are stored in a same data record including the comparison output data structure corresponding to the cell where the source formatting data and the comparison formatting data are encoded, either of the source formatting data and the comparison formatting data being read, by one or more logical processes, from a data element, the one or more logical processes determining by inspection whether read data is a source formatting data or a comparison formatting data.

12. A computer system having a computer with a display output and a computer memory for selectively displaying formatting of a comparison between a first data file representing a first version of a data table and a second data file representing a second version of the data table, the data table including at least one cell, the computer system comprising:

a module adapted by logic to store in the computer system the first data file representing the first version;

a module adapted by logic to store in the computer system the second data file representing the second version;

a module adapted by logic to generate in the computer memory a comparison output data structure having comparison output data that is produced by a comparison of the first version and the second version, the comparison output data structure organized on a cell by cell basis so that each cell in the comparison output data table is represented by at least one corresponding record in the comparison output data structure, the comparison output data structure further having source formatting data organized on a cell by cell basis and comparison formatting data organized on a cell by cell basis, the source formatting data being separated from the comparison formatting data;

a module adapted by logic to receive an input value encoding a display formatting selection for the comparison output data structure, the display formatting selection causing one or more formatting elements of the comparison output data structure to change between a hidden state and a displayed state; and a module adapted by logic to, based on the input value, generate and store a display output data set using the comparison output data structure, and
express or not express in the display output data set the source formatting data or the comparison formatting data.

13. The system of claim 12, wherein the module adapted by logic to generate and store a display output data set is further adapted by logic to select a first predetermined set of formatting data associated with presentation of no formatting at all and utilize that first predetermined set to generate the display output data set.

14. The system of claim 12, wherein the module adapted by logic to generate and store a display output data set is further adapted by logic to select a second predetermined set of formatting data associated with presentation of a subset of the source formatting data and utilize that second predetermined set of formatting to generate the display output data set.

15. The system of claim 12, wherein the module adapted by logic to generate and store a display output data set is further adapted by logic to suppress the source formatting data and to express the comparison formatting data.

16. The system of claim 12, further comprising a module adapted by logic to generate a flat graphical file that is a rendition of the display output data set expressing the comparison formatting data.

17. The system of claim 12, further comprising a module adapted by logic to generate an output file that is a spreadsheet data file, the spreadsheet data file including the formatting data utilized in the generating and storing of the display output data set.

18. The system of claim 12, further comprising a module adapted by logic to generate an output data file that is an encoding of the comparison output data structure, the comparison output data structure including the cell comparison data, the source formatting data, and the selected formatting data input, the output data file being used as input and parsed by a different computer such that the comparison output data structure is recreated in a different computer memory.

19. The system of claim 12, wherein the module adapted by logic to generate in the computer memory the comparison output data structure is further adapted by logic to store the source formatting data in a first subset of at least one data records and the comparison formatting data in a second subset of the at least one data records.

20. The system of claim 12, wherein the module adapted by logic to generate in the computer memory the comparison output data structure is further adapted by logic to store the source formatting data and the comparison formatting data for each cell in the output comparison data structure in a same data record such that the source formatting data is stored in a first data element including the data record and the comparison formatting data is stored in a second data element including the data record.

21. The system of claim 12, wherein the module adapted by logic to generate in the computer memory the comparison output data structure is further adapted by logic to store the source formatting data and the comparison formatting data for each cell in the output comparison data structure in a same data record including the data structure, the source formatting data and the comparison formatting data being encoded such that either the source formatting data or the comparison formatting data is read to determine whether the read data is the source formatting data or the comparison formatting data.

* * * * *